UNITED STATES PATENT OFFICE.

LEWIS W. CHUBB, OF EDGEWOOD PARK, PENNSYLVANIA, ASSIGNOR TO WESTINGHOUSE ELECTRIC AND MANUFACTURING COMPANY, A CORPORATION OF PENNSYLVANIA.

ELECTROLYTE FOR ELECTROLYTIC CELLS, SUCH AS LIGHTNING-ARRESTERS, CONDENSERS, AND THE LIKE.

1,270,784.

Specification of Letters Patent. Patented July 2, 1918.

No Drawing. Application filed October 2, 1914. Serial No. 864,666.

*To all whom it may concern:*

Be it known that I, LEWIS W. CHUBB, a citizen of the United States, and a resident of Edgewood Park, in the county of Allegheny and State of Pennsylvania, have invented a new and useful Improvement in an Electrolyte for Electrolytic Cells, Such as Lightning-Arresters, Condensers, and the like, of which the following is a specification.

My invention relates to electrolytes which may be used in electrolytic cells, such as lightning arresters, condensers, rectifiers and the like.

More particularly, my invention refers to certain electrolytes which form high-resistance films upon the surfaces of aluminum, tantalum, platinum, magnesium, and other film-forming metals when they are immersed in these electrolytes and subjected to electric current.

It is well known that films, which are formed upon aluminum and other film-forming metals by immersing them in a suitable electrolyte and subjecting them to an electric current flow, possess the property of allowing current to flow from the electrolyte to the electrode with little opposition, but of opposing strongly the current tending to flow from the electrode to the electrolyte. To current flowing in the last indicated direction, the film, although excessively thin, presents a high specific resistance and a high dielectric strength and, consequently, is able to withstand considerable voltage without rupture.

Heretofore, it has been substantially impossible to form permanent high-resistance films on the film-forming metals of the usual character, which films will constantly resist substantially high voltage pressures. As a result, it has been necessary to provide electrolytic cells of large capacity and adapted for high-voltage service with an unduly large number of plates or electrodes which have added considerably to the weight and the first cost of such cells.

One object of my invention is to provide electrolytes of the character above indicated, whereby high resistance films may be conveniently and cheaply formed on film-forming metals, which films will be of higher resistance and higher dielectric strength than those of films heretofore formed with the common electrolytes.

Other features of novelty of my invention will be more fully disclosed in the following description to which reference may now be had.

Electrolytes of various characters have been used which generally comprised chemical constituents that imparted either basic or neutral reactions to the electrolytes. I am also aware that electrolytes have been acidulated by the addition of small quantities of a suitable acid or acids, as, for example, an electrolyte consisting of a solution of borax which has been slightly acidulated with a small quantity of boric acid. However, I have discovered that, unless the electrolyte contains a large amount of acid in proportion to the amount of salt in the solution, it is not capable of developing a high-resistance film of maximum strength upon the film-forming metal electrodes.

By means of a long series of tests, I have discovered that, if certain salts which, in solution, are capable of forming films on film-forming metals, are combined with suitable acids in the proper proportion, the resistance of the films may be considerably increased. To obtain the most effective results, the acid constituent of the electrolyte should comprise a relatively large portion of the dissolved chemicals. For example, I have made a most desirable electrolyte comprising a solution of ammonium borate, $(NH_4)_3BO_3$ and boric acid $(H_3BO_3)$, which solution has very different film forming characteristics for different relative percentages of the salt and the acid constituents. When a relatively small percentage of boric acid is added to a solution of ammonium borate, the ammonium borate being largely in excess, the films formed on the film-forming metal electrodes, as, for instance, aluminum electrodes, are capable of resisting voltages of about 300 volts only without rupturing. By increasing the proportion of the boric-acid constituent relative to the ammonium borate constituent, I have found that, within certain limits, the dielectric resistance of the films formed on the electrodes may be rapidly increased. Films of highest resistance over a wide range of impressed voltages may be formed when the boric acid constituent comprises between 75 per cent. to 98 per cent. of the total gram-molecules of the soluble material present, namely, boric acid and ammonium borate, although films having high specific resistance may be formed when the boric-acid constituent comprises at least 45 per cent, of the total gram-molecules of the soluble material present. When the boric-acid constituent comprises substantially 97 per cent. and not over 98 per cent. of the total gram-molecules of the soluble material, the films are capable of resisting substantially 500 volts without being ruptured.

While a solution of boric acid and ammonium borate is particularly desirable because of its ability to form very high-resistance films, solutions of other acids and other salts of acids may be suitable to develop high-resistance films on electrodes, and I wish it to be understood that my invention may be applied to electrolytes comprising solutions of substances which form insoluble compounds of the film-forming metals. For example, I have made electrolytes having good film-forming qualities of citric acid and ammonium citrate and of tartaric acid and ammonium tartrate. Other acids and other salts of acids which may be useful in making electrolytes in accordance with my invention and which may be characterized as being suitable to form high-resistance films on film-forming metals, in addition to the above-mentioned acids and salts of acids, are oxalic acid, acetic acid, carbonic acid, and the like, and oxalates, acetates, carbonates, soluble silicates, and the like. Of course, it will be understood that a suitable acid may be combined with a suitable salt other than a salt of the same acid to form a solution which may be used as an electrolyte, for example, a solution of boric acid and sodium silicate forms a very desirable electrolyte. When electrodes composed of metals, such as are mentioned above, are immersed in solutions that contain ingredients capable of forming films thereupon by electrolytic action, which films may serve as di-electrics of higher or lower resistance, such solutions may be characterized as "film-forming electrolytes." All such substances as hereinbefore indicated are embraced by the term "film-forming " as it is used in the subjoined claims.

An electrolyte comprising boric acid and ammonium borate is particularly desirable because the solution formed is an inorganic solution which does not rapidly deteriorate. This is highly desirable because aluminum cells are commonly used as lightning arresters which are usually disposed in inaccessible places where the cells may not be frequently inspected. In the past, many electrolytes have been made of organic substances in which fungus growths develop, thereby rendering the aluminum cell ineffective as a lightning arrester. In an electrolyte of boric acid and ammonium borate, fungus growths cannot develop. Again, such an electrolyte maintains its chemical properties for a long time. In practice, it will probably be advantageous to add an excess of crystals of boric acid to the electrolyte. In other words, the electrolyte should consist of at least a saturated solution of the acid, in this case, boric acid, which is accomplished by adding the above-mentioned excess crystals.

Of course, any solvents may be used in which the salts and the acids selected for my electrolyte are soluble, and frequently it may be desirable to use aqueous solutions for electrolytes embodying my invention, but it will be apparent that I do not desire to limit my invention to aqueous solutions only.

An electrolyte made in accordance with my invention and containing a solution of boric acid and ammonium borate may form films on film-forming metals which are capable of resisting a pressure of substantially 500 volts without being ruptured. In view of this, the total number of plates or electrodes comprising a cell, which is adapted to be utilized at a certain voltage, may be materially reduced, or cells may be made which are adapted for use under very high-voltage service conditions, which cells will not embody a large number of plates or electrodes.

While I have described in detail one electrolyte made in accordance with my invention, it will be understood that I desire to have only such limitations imposed as are indicated in the appended claims.

I claim as my invention:

1. A film-forming electrolyte containing a solution of an acid and a solution of a salt, the number of gram-molecules of acid present being 45% to 98% of the total gram-molecules of the soluble material.

2. A film-forming electrolyte containing a solution of an acid and a solution of an ammonium salt, the number of gram-molecules of acid present being 45% to 98% of the total gram-molecules of the soluble material.

3. A film-forming electrolyte containing a solution of an acid and a solution of ammonium borate, the number of gram-molecules of acid present being 45% to 98% of the total gram-molecules of the soluble material.

4. A film-forming electrolyte containing a solution of boric acid and a solution of a salt, the number of gram-molecules of boric acid present being 45% to 98% of the total gram-molecules of the soluble material.

5. A film-forming electrolyte containing a solution of boric acid concentrated to at least saturation and a smaller amount, relative to the amount of dissolved acid, of a solution of an ammonium salt.

6. A film-forming electrolyte containing a solution of boric acid and a solution of an ammonium salt, the number of gram-molecules of boric acid present being 45% to 98% of the total gram-molecules of the soluble material.

7. An electrolyte containing a solution of boric acid and a solution of ammonium borate, the number of gram-molecules of boric acid present being 45% to 98% of the total gram-molecules of the soluble material.

8. A film-forming electrolyte containing a solution of boric acid and a solution of a salt, the number of gram-molecules of boric acid present being 80% to 98% of the total gram-molecules of the soluble material.

9. A film-forming electrolyte containing a solution of boric acid and a solution of an ammonium salt, the number of gram-molecules of boric acid present being 80% to 98% of the total gram-molecules of the soluble material.

10. An electrolyte containing a solution of boric acid and a solution of ammonium borate, the number of gram-molecules of boric acid present being 80% to 98% of the total gram-molecules of the soluble material.

11. A film-forming electrolyte containing a solution of boric acid and a solution of a salt, the number of gram-molecules of boric acid present being substantially 97% of the total gram-molecules of the soluble material.

12. A film-forming electrolyte containing a solution of boric acid and a solution of an ammonium salt, the number of gram-molecules of boric acid present being substantially 97% of the total gram-molecules of the soluble material.

13. An electrolyte containing a solution of boric acid and a solution of ammonium borate, the number of gram-molecules of boric acid present being substantially 97% of the total gram-molecules of the soluble material.

14. A film-forming electrolyte containing a solution of an acid and a solution of a salt of the same acid, the number of gram-molecules of the acid present being 45% to 98% of the total gram-molecules of the soluble material.

15. A film-forming electrolyte containing a solution of an acid and a solution of an ammonium salt of the same acid, the number of gram-molecules of acid present being 45% to 98% of the total gram-molecules of the soluble material.

In testimony whereof I have hereunto subscribed my name this 29th day of Sept., 1914.

LEWIS W. CHUBB.

Witnesses:
 B. B. HINES,
 M. C. MERZ,